(12) United States Patent
Yalamanchili

(10) Patent No.: US 9,183,174 B2
(45) Date of Patent: Nov. 10, 2015

(54) USE CASE BASED RECONFIGURATION OF CO-PROCESSOR CORES FOR GENERAL PURPOSE PROCESSORS

(71) Applicant: QUALCOMM Incorporated, San Diego, CA (US)

(72) Inventor: Kishore Yalamanchili, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 13/843,006

(22) Filed: Mar. 15, 2013

(65) Prior Publication Data

US 2014/0281472 A1  Sep. 18, 2014

(51) Int. Cl.
*G06F 15/177* (2006.01)
*G06F 15/78* (2006.01)

(52) U.S. Cl.
CPC ........ *G06F 15/7871* (2013.01); *G06F 15/7867* (2013.01)

(58) Field of Classification Search
CPC  G06F 15/7807; G06F 15/7867; G06F 9/3885
See application file for complete search history.

(56) References Cited

U.S. PATENT DOCUMENTS

| | | | |
|---|---|---|---|
| 6,550,017 B1 | 4/2003 | Moiin et al. | |
| 7,433,389 B2 | 10/2008 | Soerensen et al. | |
| 7,592,835 B2 | 9/2009 | Agarwal et al. | |
| 8,156,307 B2* | 4/2012 | Wallach et al. | 711/203 |
| 2009/0031104 A1* | 1/2009 | Vorbach et al. | 712/18 |
| 2010/0057647 A1 | 3/2010 | Davis et al. | |
| 2010/0115233 A1* | 5/2010 | Brewer et al. | 712/7 |
| 2010/0174884 A1* | 7/2010 | Morishita et al. | 712/15 |
| 2011/0246691 A1* | 10/2011 | Stillwell et al. | 710/104 |
| 2011/0258419 A1* | 10/2011 | Glew | 712/223 |
| 2012/0099630 A1 | 4/2012 | Verhelst et al. | |

OTHER PUBLICATIONS

Annapolis Micro Systems, "Wildstar 6 Products", Annapolis Micro Systems, Inc., 2005-2011, 3 pgs.
Bormans, J., "Reconfigurable Array Processor Satisfies Multi-Core Platforms", Chip Design Magazine, 2006, 5pgs.
Mudagal, V., "Methods for Upgrading Reconfigurable Hardware Used in Mobile Phones", Freescale Semiconductor, Inc., 2006, 14pgs.
Vorbach, et al., "Reconfigurable Processor Architectures for Mobile Phones", International Proceedings Parallel and Distributed Processing Symposium, 2003, 6 pgs.

* cited by examiner

*Primary Examiner* — Dennis M Butler
(74) *Attorney, Agent, or Firm* — Withrow & Terranova, PLLC

(57) ABSTRACT

A wireless mobile device includes a configurable co-processor core(s). The wireless mobile device also includes a multi-core central processing unit coupled to a memory and the configurable co-processor core(s). The multi-core central processing unit may select from a set of hardware accelerators according to a user's use pattern. The wireless mobile device also includes a hardware controller that reconfigures the configurable co-processor core(s) according to a selected hardware accelerator.

22 Claims, 8 Drawing Sheets

USE CASE BASED RECONFIGURATION OF CO-PROCESSOR CORES FOR GENERAL PURPOSE PROCESSORS

BACKGROUND

1. Field

The present disclosure generally relates to integrated circuit design. More specifically, the present disclosure relates to reconfiguration of co-processor cores for general purpose processors.

2. Background

The popularity of computing systems continues to grow and the demand for improved processing architectures likewise continues to grow. The ever-increasing demand for improved computing performance/efficiency has led to various improved processor architectures. For example, multi-core processors are now more prevalent in the computing industry and used in various computing devices, such as servers, personal computers (PCs), laptop computers, personal digital assistants (PDAs), wireless telephones, and other like wireless mobile devices. As described herein, wireless mobile devices include, but are not limited to, mobile phones, hand-held personal communication systems (PCS) units, portable data units (e.g., personal data assistants), GPS enabled devices, navigation devices, music players, video players, entertainment units, or any other battery powered device that stores or retrieves data or computer instructions, or any combination thereof.

Balancing power and performance in wireless mobile devices, specifically, trading off power for performance by operating at a lower power and/or frequency is a challenge to the design of wireless mobile devices. Designers of wireless mobile devices are also constrained by the size and weight of batteries. The size and weight limitations are generally due to the increasing power consumption of the device hardware. Recent hardware architectural improvements may ease the balancing of power and performance when designing wireless mobile devices.

Previous CPUs (central processing units) featured a single execution unit to process instructions of a program. More recently, computer systems are being developed with multiple processors to improve the computing performance of the system. In some instances, multiple independent processors may be implemented in a system. In other instances, a multi-core architecture may be employed, in which multiple processor cores are amassed on a single integrated silicon die. Each of the multiple processors (e.g., processor cores) can simultaneously execute program instructions. This parallel operation of the multiple processors can improve the performance of a variety of applications.

A multi-core CPU combines two or more independent cores into a single package comprised of a single piece silicon integrated circuit (IC), referred to as a die. In some instances, a multi-core CPU may comprise two or more dies packaged together. A dual-core device contains two independent microprocessors and a quad-core device contains four microprocessors. Cores in a multi-core device may share a single coherent cache at the highest on-device cache level or may have separate caches. The processors also share the same interconnect to the rest of the system. Each "core" may independently implement optimizations such as superscalar execution, pipelining, and multithreading. A system with N cores is conventionally most effective when it is presented with N or more threads concurrently.

In some architectures, special-purpose processors that are often referred to as "accelerators" are implemented to perform certain types of operations. For example, a processor executing a program may offload certain types of operations to an accelerator that is configured to perform those types of operations efficiently. Such hardware acceleration employs hardware to perform some function faster than is possible in software running on a normal (general-purpose) CPU. Hardware accelerators may be designed for computationally intensive software code. Depending upon granularity, hardware acceleration can vary from small functional units to large functional blocks. Examples of such hardware acceleration include blitting acceleration functionality in graphics processing units (GPUs) and instructions for complex operations in CPUs.

Application-specific integrated circuits (ASICs) are conventionally implemented as custom designs. An ASIC is an integrated circuit (IC) customized for a particular use, rather than intended for general-purpose use. For example, an ASIC may be implemented as a chip that is designed solely to run a wireless mobile device (e.g., a cellular telephone). Designers of digital ASICs may use a hardware description language (HDL) such as Verilog or VHDL, to describe the functionality of ASICs. Once a design is completed and a mask set produced for a. target chip, an ASIC is created. The configuration is created once. If a new configuration is specified, an entirely new design is specified. Thus, ASICs are not field-programmable.

Various devices are known that are reconfigurable. Examples of such reconfigurable devices include field-programmable gate arrays (FPGAs). A field-programmable gate array (FPGA) is a well-known type of semiconductor device containing programmable logic components called "logic blocks", and programmable interconnects. Logic blocks can be programmed to perform the function of basic logic gates, or more complex combinational functions such as decoders or simple mathematical functions. In some FPGAs, the logic blocks also include memory elements, which may be simple flip-flops or more complete blocks of memories. A hierarchy of programmable interconnects allows logic blocks to be interconnected as desired by a system designer. Logic blocks and interconnects can be programmed by the customer/designer, after the FPGA is manufactured, to implement any logical function, hence the name "field-programmable."

SUMMARY

According to one aspect of the present disclosure, a wireless mobile device including a configurable co-processor core(s) is described. The wireless mobile device includes a multi-core central processing unit coupled to a memory and the configurable co-processor core(s). The multi-core central processing unit may be operable to select from a set of hardware accelerators according to a user's use pattern. The wireless mobile device also includes a hardware controller that is operable to reconfigure the configurable co-processor core(s) according to a selected hardware accelerator. Although this specification is with respect to a hardware controller performing the configuring, the main processor core could also act as the controller for reconfiguring the core(s).

According to another aspect of the present disclosure, a method for reconfiguration of co-processor cores for general purpose processors is described. The method includes selecting from a set of hardware accelerators according to a user's use pattern. The method also includes reconfiguring the configurable co-processor core(s) of a general purpose processor according to a selected hardware accelerator.

According to a further aspect of the present disclosure, a wireless mobile device including a configurable co-processor core(s) is described. The wireless mobile device includes a multi-core central processing unit coupled to a memory and the configurable co-processor core(s). The multi-core central processing unit may be operable to select from a set of hardware accelerators according to a user's use pattern. The wireless mobile device also includes a means for reconfiguring the configurable co-processor core(s) according to a selected hardware accelerator.

According to an additional aspect of the present disclosure, a computer program product for a wireless mobile device that includes a configurable co-processor core(s) is described. The computer program product includes a non-transitory computer-readable medium having program code recorded thereon. The program code includes program code to select from a set of hardware accelerators according to a user's use pattern. The program code also includes program code to reconfigure the configurable co-processor core(s) of a general purpose processor according to a selected hardware accelerator.

According to another aspect of the present disclosure, a method for reconfiguration of co-processor cores for general purpose processors is described. The method includes selecting a hardware accelerator from an on-line hardware configuration store. The method also includes loading a selected hardware accelerator into a configurable co-processor core(s) of a general purpose processor to operate as the selected hardware accelerator.

According to an additional aspect of the present disclosure, a computer program product for a wireless mobile device that includes a configurable co-processor core(s) is described. The computer program product includes anon-transitory computer-readable medium having program code recorded thereon. The program code includes program code to select a hardware accelerator from an on-line hardware configuration store. The program code also includes program code to load a selected hardware accelerator into a configurable co-processor core(s) of a general purpose processor to operate as the selected hardware accelerator.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Multi-core processors are proposed for providing improved performance. In addition, application specific hardware acceleration units for various applications, like computational photography, 3D imaging, etc., are being designed to co-exist with a main processor core. Usually the applications for such systems are explicitly designed to exploit the available hardware acceleration. Also, in systems with reconfigurable units for hardware acceleration, the current approach is generally to design so that some portion of the application is implemented in hardware languages and the rest on the CPU (which is similar to software-hardware co-design with better flexibility).

The incorporation of hardware acceleration units enables the main processor core (e.g., central processing unit (CPU)) to achieve improved operation for some applications based on the hardware acceleration units incorporated in the design. Thus, the end user gets a device that achieves improved operation capabilities for some applications over others. It is not possible, however, for the piece of silicon to operate better (or even optimally) for all possible use-cases. Also, when the user is not using these application specific cores, even with power gating, these cores can consume considerable amounts of leakage power.

Unlike software applications, the hardware in a. mobile wireless device is limited to the configuration in place when the mobile wireless device is purchased. Configurable co-processor core(s) are proposed for also providing improved performance. The use of configurable co-processor core(s), however, involves a. change in the software as well as the software design approach for these systems.

Figure 1:
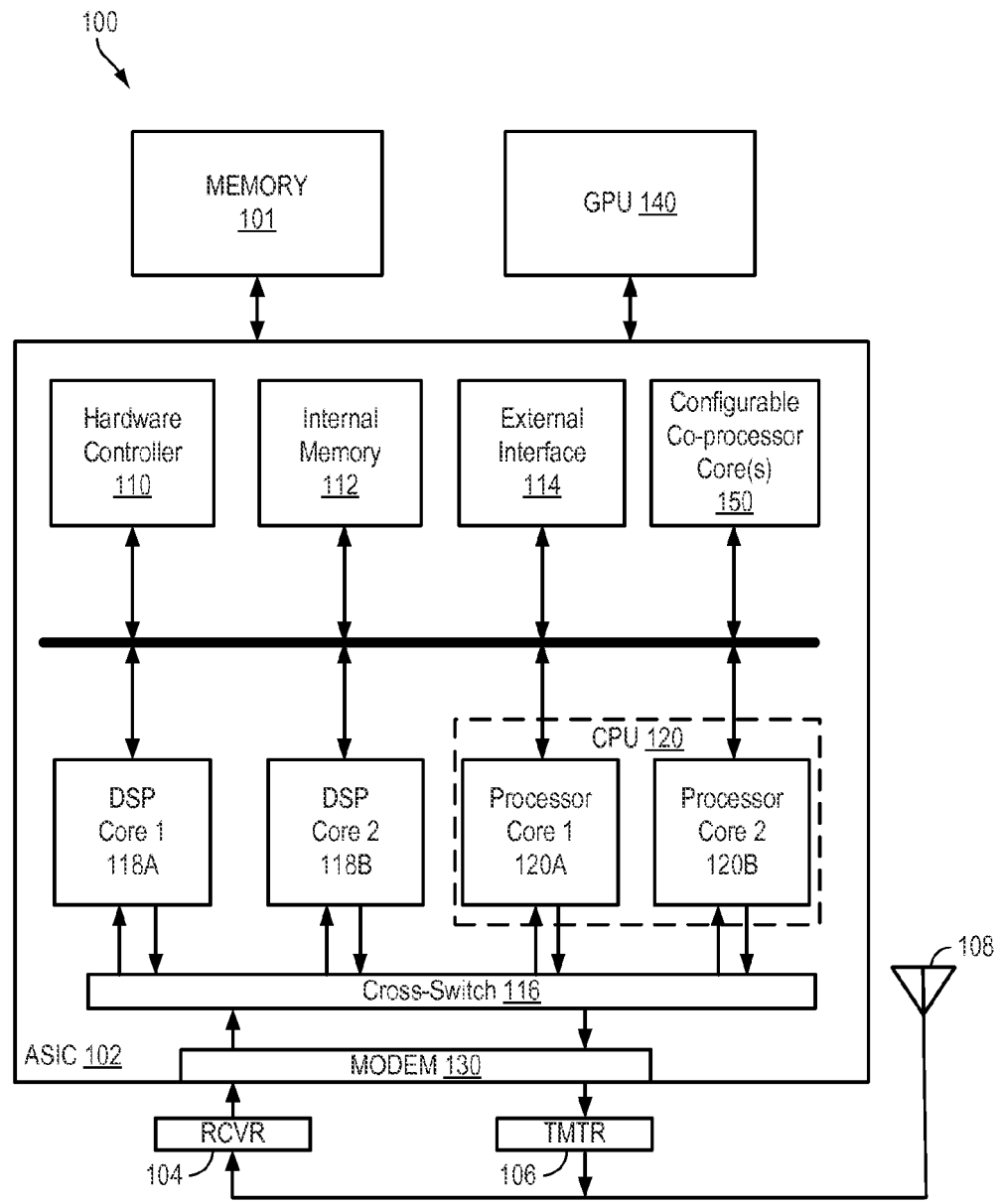
FIG. 1 is a block diagram of a wireless mobile device that includes a configurable co-processor core, according to one aspect of the disclosure.

FIG. 1 shows a block diagram of a wireless mobile device 100 that includes a multi-processor system having a configurable co-processor core(s) 150 according to one aspect of the disclosure. The wireless mobile device 100 may monitor and/or communicate with one or more wireless communication systems. On the receive path, an antenna 108 receives signals transmitted by base stations and/or satellites and provides a received signal to a. receiver (RCVR) 101. The receiver 104 processes (e.g., filters, amplifies, frequency downconverts, and digitizes) the received signal and provides samples to an application specific integrated circuit (ASIC) 102 for further processing. On the transmit path, the ASIC 102 processes data to be transmitted and provides data to a transmitter (TMTR) 106. The transmitter 106 processes (e.g., converts to analog, filters, amplifies, and frequency upconverts) the data and generates a modulated signal, which is transmitted via the antenna 108. A modem 130 interfaces with the receiver 104 and the transmitter 106 to enable communication by the wireless mobile device 100.

The ASIC 102 includes various processing units that support multi-threaded operation. For the configuration shown in FIG. 1, the ASIC 102 includes digital signal processor (DSP) cores 118A and 118B, and a multi-core central processing unit (CPU) 120. In this configuration, the multi-core CPU 120 is a multi-core processor that includes processor cores 120A and 120B. The ASIC 102 also includes a cross-switch 116, a hardware controller 110, an internal memory 112, and an external interface unit 114. The DSP cores 118A and 118B, and the processor cores 120A and 120B of the multi-core CPU 120 support various functions such as video, audio, graphics, gaming, and the like. Each processor core may be a RISC (reduced instruction set computing) machine, a microprocessor, or some other type of processor.

In this configuration, the hardware controller 110 controls the operation of the processing units within the ASIC 102. The internal memory 112 stores data and program codes used by the processing units within the ASIC 102. The external interface unit 114 interfaces with other units external to the ASIC 102. In general, the ASIC 102 may include fewer, more and/or different processing units than those shown in FIG. 1. The number of processing units and the types of processing units included in the ASIC 102 are dependent on various factors, such as the communication systems, applications, and functions supported by the multi-processor system of the wireless mobile device 100. Although not shown, the wireless mobile device 100 is battery powered. Although described with reference to wireless mobile devices, reconfiguration of co-processor cores for general purpose processors, according to one aspect of the present disclosure, may be implemented in desktop environments or other like fixed workstations.

The multi-threaded operation may be implemented in various ways. For example, these techniques may be implemented in hardware, firmware, software, or a combination thereof. For a hardware implementation, the texture coding techniques may be implemented within one or more ASICs, DSPs, programmable logic devices (PLDs), FPGAs, processors, controllers, micro-controllers, microprocessors, electronic devices, other electronic units designed to perform the functions described herein, or a combination thereof. Certain aspects of the multi-threaded operation may be implemented with software modules (e.g., procedures, functions, and so on) that perform the functions described. The software codes may be stored in a memory (e.g., a memory 101 and/or the internal memory 112 in FIG. 1) and executed by a processor (e.g., DSP cores 118A and/or 118B). The memory may be implemented within the processor or external to the processor.

The ASIC 102 further couples to the memory 101 that stores hardware acceleration instructions. For the configuration shown in FIG. 1, each processing core may execute the instructions. In this configuration, the ASIC 102 communicates with a graphics processing unit (GPU) 140, and includes a configurable co-processor core(s) 150, as further illustrated in FIGS. 3 to 6. The configurable co-processor core(s) 150 may be part of a co-processor or implemented as one of the processor cores 120A and/or 120B of the multi-core CPU 120. The configurable core can be loosely coupled or tightly coupled to the main processor (e.g., the multi-core CPU 120).

Figure 2:
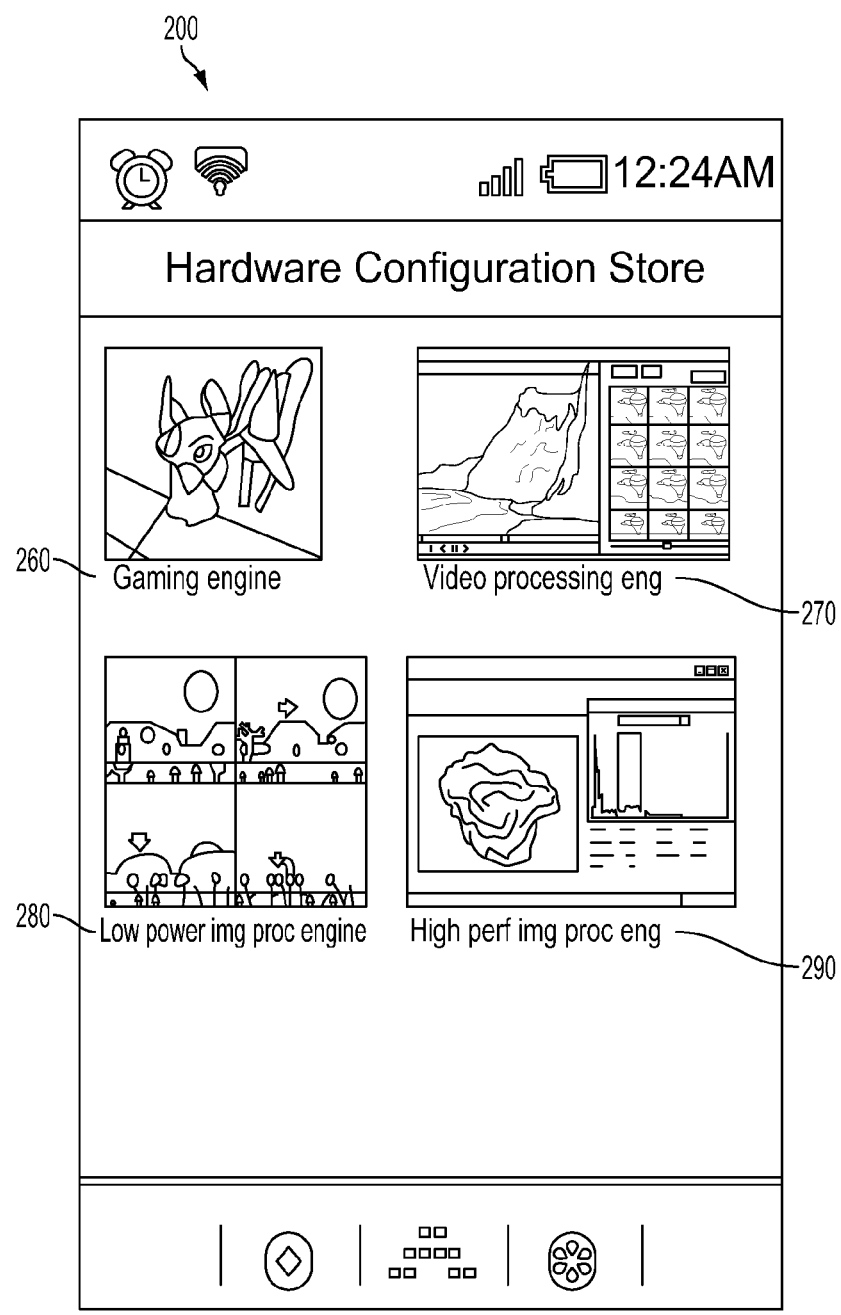
FIG. 2 is a block diagram of an on-line hardware configuration store, according to a one aspect of the disclosure.

In this aspect of the present disclosure, the configurable co-processor core(s) 150 is added to the processor cores 120A and 120B of the multi-core CPU 120 of the wireless mobile device. With various possible use-cases for the wireless mobile device 100, this configurability, together with aspects of the present disclosure, provides the end user with the flexibility to reconfigure the hardware inside the wireless mobile device 100, similar to choosing the software applications running on the device. Reconfiguring the configurable co-processor core(s) 150 appropriately/adaptively may provide hardware that works better (or even optimally) for the use-case of current interest. The configurable co-processor core(s) 150 can be reconfigured to a desired hardware structure by acquiring appropriate build files by for example, downloading from an on-line hardware configuration store as shown in FIG. 2. The hardware configuration store may store all the configuration builds currently available for the configurable co-processor core(s) 150. These builds can be changed (including bug fixes, adding new builds, etc.) similar to the software apps in an app store. Desired hardware structures may also be acquired in other ways, including but not limited to copying from a flash drive, syncing a device, transfer via USB or other cable and the like.

In one configuration, the configurable co-processor core(s) 150 includes a set of field-programmable gate array (FPGA) containing programmable logic components called "logic blocks", and programmable interconnects. Logic blocks can be programmed to perform the function of basic logic gates, or more complex combinational functions such as decoders or simple mathematical functions. The logic blocks also include memory elements, which may be simple flip-flops or more complete blocks of memories. A hierarchy of programmable interconnects allows the logic blocks to be interconnected. In this configuration, the controller 110 uses binary data. of a downloaded build file from the on-line hardware configuration store to program the logic blocks and interconnects to implement the logical functions of a selected hardware accelerator corresponding to the build file. Alternatively, the configurable co-processor core(s) 150 can be reconfigured as described in Vorbach, M.; Becker, R.; "Reconfigurable processor architectures for mobile phones," *Parallel and Distributed Processing Symposium,* 2003. *Proceedings. International*, vol., no., pp. 6 pp., 22-26 Apr. 2003, the disclosure of which is incorporated by reference herein in its entirety.

FIG. 2 is a block diagram of an on-line hardware configuration store 200, according to a further aspect of the disclosure. In this configuration, the user can reconfigure a configurable co-processor core(s) 150 (FIG. 1) to operate as hardware of interest. This can be done through the on-line hardware configuration store 200, in a manner similar to an app-store. Representatively, the on-line hardware configuration store 200 includes build files for reconfiguring the configurable co-processor core(s) 150 to operate as a gaming engine 260, a video processing engine 270, a low power image processing engine 280, a high performance image processing engine 290, or other like hardware accelerator. The modularity of the available engines in the hardware configuration store 200 can be smaller or larger than the examples shown in FIG. 2. For example, the builds can correspond to representations as simple as counters or image rotate accelerators.

Reconfiguring the configurable co-processor core(s) 150 may be similar to installing and uninstalling an application through an application store. Thus a wireless mobile device may be adapted to users changing specifications and interests. The multi-processor system of the wireless mobile device 100 can run the same traditional software and use the same software design approach by dynamically skipping/mapping execution of the corresponding modules to the hardware accelerator, at run time. The configurable co-processor core(s) 150 may also act as a co-processor with some standard instruction interface.

Figure 3:
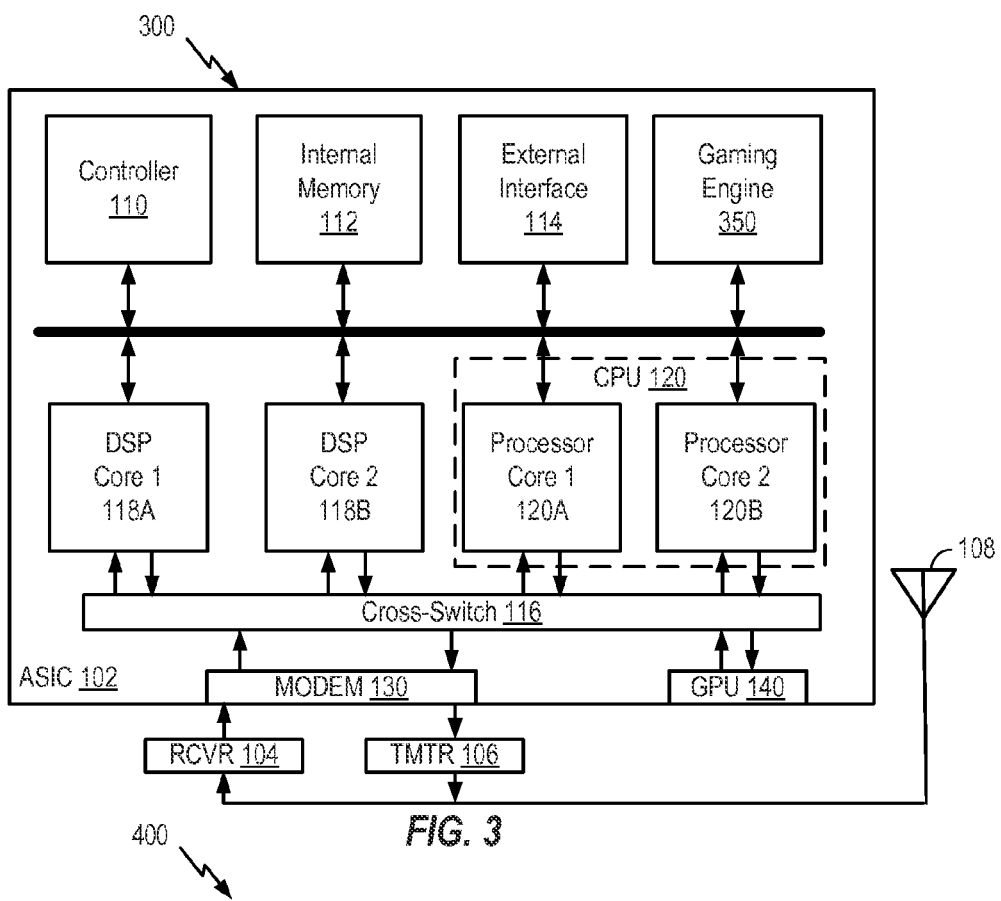
FIG. 3 is a block diagram further illustrating the configurable co-processor core of FIG. 1, reconfigured as a gaming engine according to a further aspect of the disclosure.

FIG. 3 is a block diagram further illustrating the configurable co-processor core(s) 150 of FIG. 1, configured as a gaming engine 350 according to a further aspect of the disclosure. In this configuration, the user selects the gaming engine 260 from the hardware configuration store. One selected, the multi-core CPU 120 of the wireless mobile device 300 downloads a build file corresponding to the gaming engine 260. Once downloaded, a hardware controller 110 may reconfigure the configurable co-processor core(s) 150 (FIG. 1) to operate as a gaming engine 350.

Figure 4:
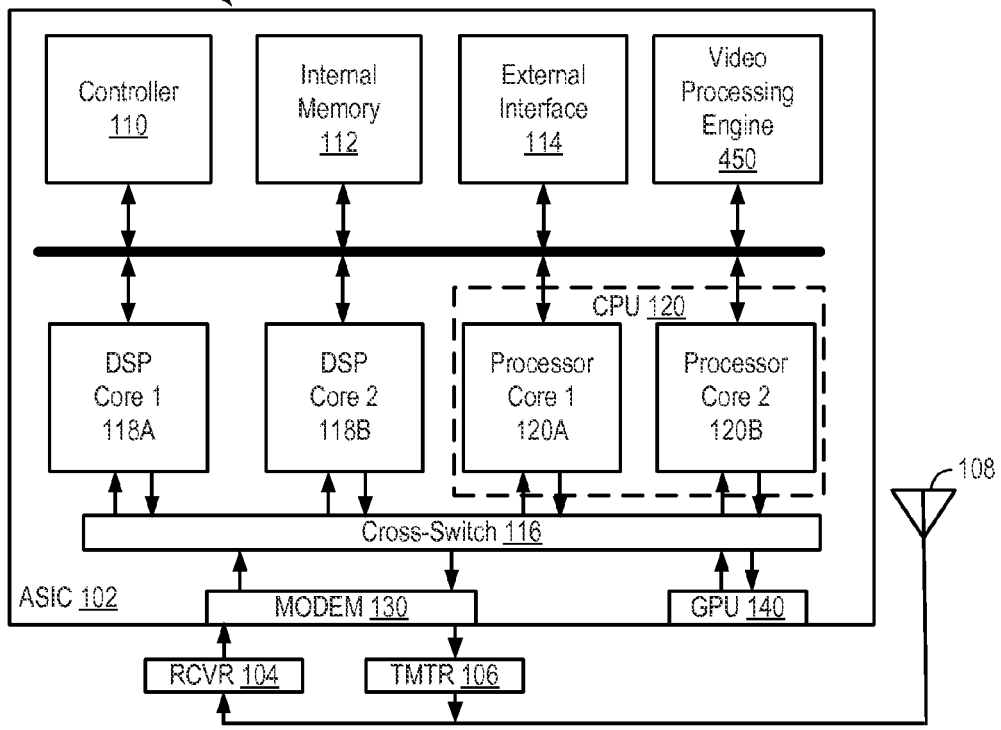
FIG. 4 is a block diagram further illustrating the configurable co-processor core of FIG. 1, reconfigured as a video processing engine according to a further aspect of the disclosure.

FIG. 4 is a block diagram further illustrating the configurable co-processor core(s) 150 of FIG. 1, reconfigured as a video processing engine 450 according to a further aspect of the disclosure. The multi-core CPU 120 of the wireless mobile device 400 downloads a build file corresponding to the video processing engine 270 selected by the user from the on-line hardware configuration store 200. Once downloaded, the hardware controller 110 may reconfigure the configurable co-processor core(s) 150 (FIG. 1) to operate as a video processing engine 450.

Figure 5:
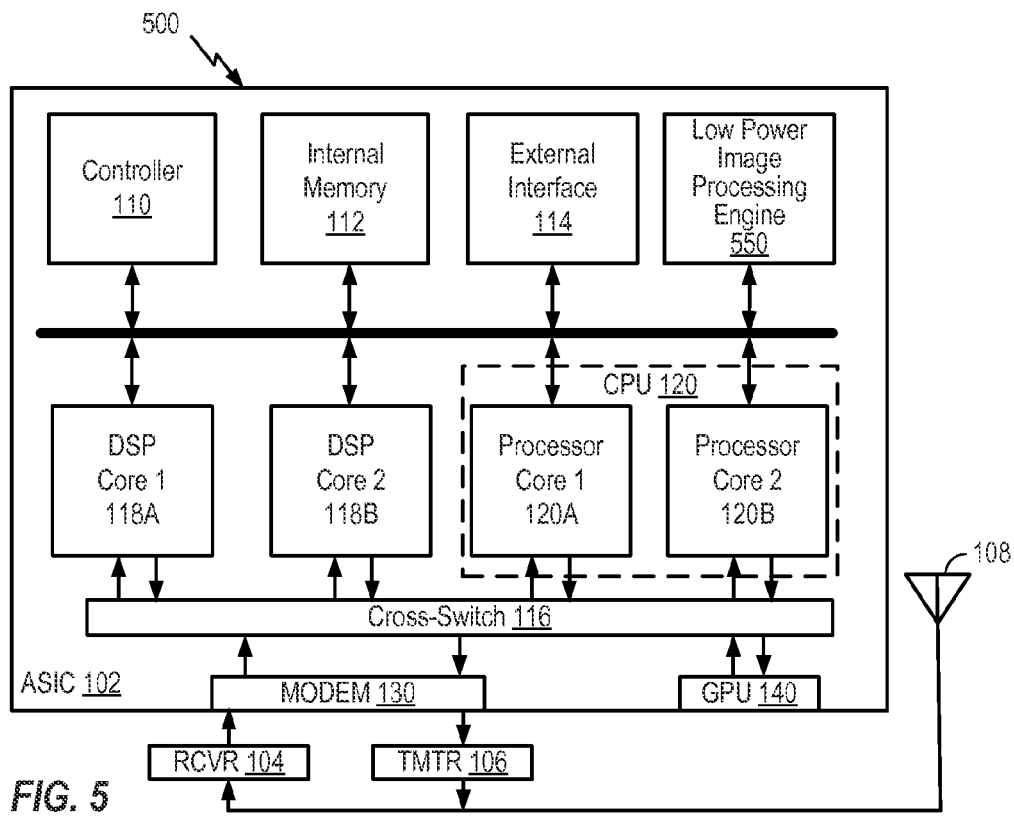
FIG. 5 is a block diagram further illustrating the configurable co-processor core of FIG. 1, reconfigured as a low power image processing engine according to a further aspect of the disclosure.

FIG. 5 is a block diagram further illustrating the configurable co-processor core(s) 150 of FIG. 1, reconfigured as a low power image processing engine 550 according to a further aspect of the disclosure. In this configuration, the user selects the low power image processing engine 280 from the on-line hardware configuration store 200. Once selected, the multi-core CPU 120 of the wireless mobile device 500 downloads a build file corresponding to the low power image processing engine 280 from the on-line hardware configuration store 200. Once downloaded, the hardware controller 110 may reconfigure the configurable co-processor core(s) 150 (FIG. 1) to operate as a low power image processing engine 550.

Figure 6:
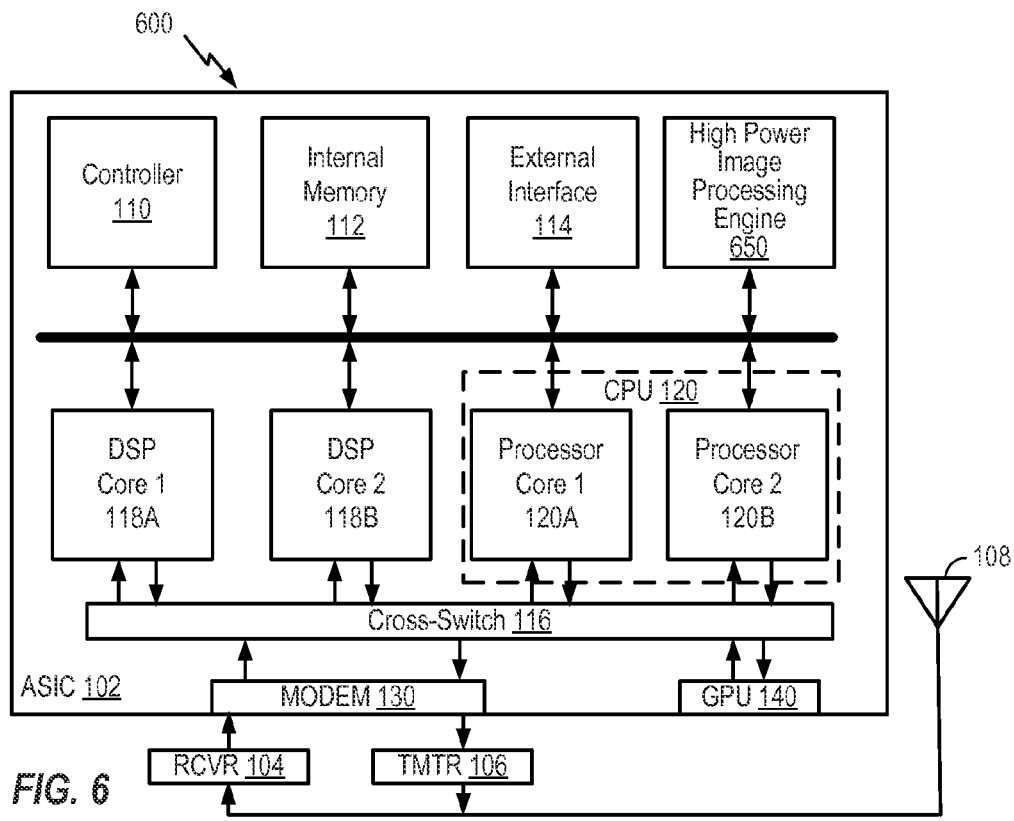
FIG. 6 is a block diagram further illustrating the configurable co-processor core of FIG. 1, reconfigured as a high power image processing engine according to a further aspect of the disclosure.

FIG. 6 is a block diagram further illustrating the configurable co-processor core(s) 150 of FIG. 1, configured as a high power image processing engine 650 according to a further aspect of the disclosure. The multi-core CPU 120 of the wireless mobile device 600 downloads a build file corresponding to the high power image processing engine 290 selected by the user from the on-line hardware configuration store 200. Once download, the hardware controller 110 may reconfigure the configurable co-processor core(s) 150 (FIG. 1) to operate as a high power image processing engine 650.

Figure 7:
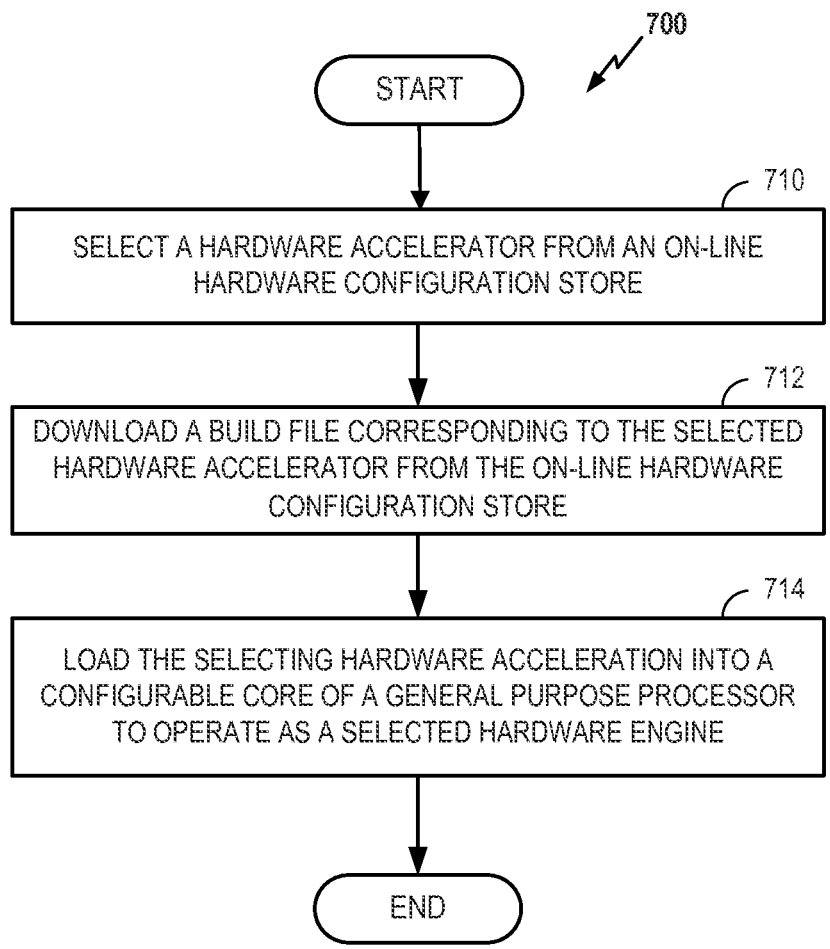
FIG. 7 is a process flow diagram showing a method for reconfiguring a configurable co-processor core according to an illustrative aspect of the present disclosure.

FIG. 7 is a process flow diagram showing a method 700 for reconfiguring a configurable core of a wireless mobile device according to an illustrative aspect of the present disclosure. At block 710, a hardware accelerator is selected from an on-line hardware configuration store. For example, as shown in FIG. 2, a user can select one of the hardware accelerators available from the on-line hardware configuration store 200 based on his/her use-case of interest. At block 712, a build file corresponding to the selected hardware accelerator is downloaded from the on-line hardware configuration store. At block 714, the build file corresponding to the selecting hardware accelerator is loaded into a configurable co-process core of a wireless mobile device to operate as the selected hardware engine. For example, as shown in FIG. 1, the hardware controller 110 may reconfigure the configurable co-processor core(s) 150 to operate as a gaming engine 350 (FIG. 3), a video processing engine 450 (FIG. 4), a low power image processing engine 550 (FIG. 5), a high power image processing engine 650 (FIG. 6), or other like hardware accelerator.

As shown in FIGS. 2 to 6, the user can select any build file (provided by validated sources) from the on-line hardware configuration store 200 (similar to an application store). Once selected, a wireless mobile device is configured to perform better (or even optimally) for a particular use case(s) of current interest. This download process can be similar to a firmware update or software installation based on the implementation, after the user chooses the build file to install in the configurable co-processor core(s) 150 (FIG. 1). The vendor can provide builds optimal for various possible use-cases and simplify the process of adding extra hardware support for improving new use cases. The user can select a build file from a list of available hardware accelerators from the on-line hardware configuration store 200 (e.g., a low power image processing build file, a high performance image processing build file, a 3D image reconstruction build file) and reconfigure the configurable core of a mobile wireless device according to the use-case of interest. The configurable co-processor core(s) 150 can also be configured as an additional small general purpose core for additional performance.

In another aspect of the disclosure, an automated process for reconfiguration of a configurable co-processor core is described. In particular, some users may not want to manually switch between hardware engines of interest. These users do not want to manually reconfigure the configurable co-processor cores) to hardware engines of interest. Other users may not even recognize the importance of this reconfiguration. That is, manual reconfiguration might make things more efficient, but automated reconfiguration may be more comfortable. In addition, although a user's use-cases of interest may change over time, most users have a pattern that can be learned over time.

In this configuration, a CPU can profile a user's usage in the background and auto-reconfigure the device, from the list of available builds, based on a determined usage pattern of the user. The reconfiguration may be done each time a user switches from one intensive task to another. To prevent large amounts of any associated reconfiguration overhead, the algorithm can adjust itself to reconfigure after a duration of time or usage, which may be predetermined. Reconfiguration decisions can be dependent on the type of configurable blocks and recommendations on reconfiguration.

Figure 8:
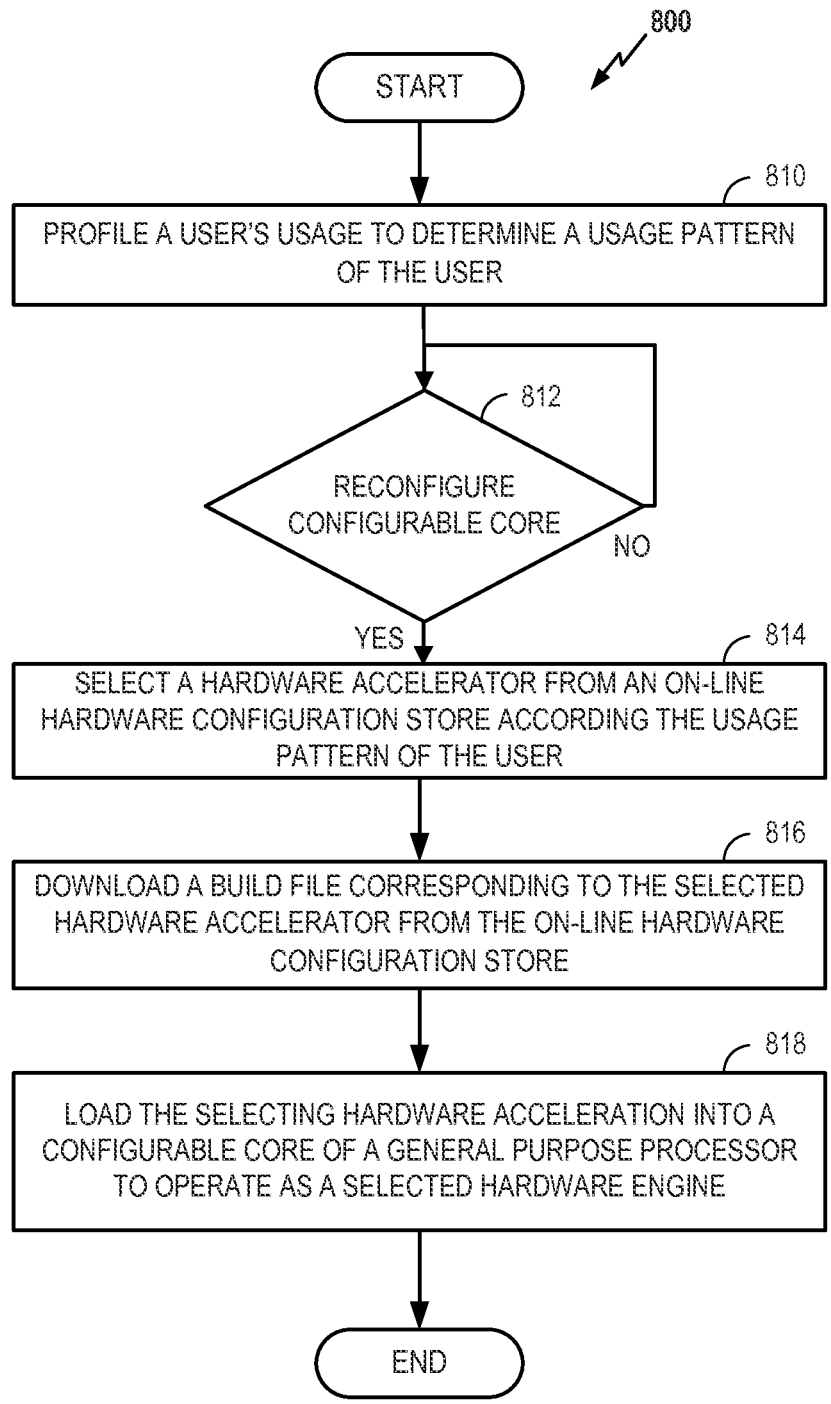
FIG. 8 is a process flow diagram showing a method for automated reconfiguration of a configurable co-processor core according to an illustrative aspect of the present disclosure.

FIG. 8 is a process flow diagram showing a method 800 for automated reconfiguration of a configurable core according to an illustrative aspect of the present disclosure. At block 810, a user's usage of a wireless mobile device is profiled to determine a usage pattern of the user. Once the usage pattern of the user is determined, at block 812, it is determined whether to reconfigure a configurable core of the wireless mobile device.

For example, as shown in FIG. 1, a multi-core CPU 120 may periodically collect information on the type of hardware accelerators available from the on-line hardware configuration store 200. In this configuration, the multi-core CPU 120 detects execution of a software module corresponding to a hardware accelerator available from the on-line hardware configuration store 200. When an executed software module of the wireless mobile device 100 corresponds to a hardware accelerator available from the on-line hardware configuration store 200, a count associated with the software module is increased. In one configuration, a duration of the execution time of the software module is also stored. The count for the current configuration of the configurable co-processor core(s) 150 is increased whenever it is used. The duration of execution for the current configuration of the configurable co-processor core(s) 150 is also stored.

In this configuration, when the difference between the highest count of the corresponding software module and the count for the current configuration of the configurable co-processor core(s) 150 crosses a threshold, the hardware controller 110 reconfigures the configurable co-processor core(s) 150 to operate as the hardware accelerator corresponding to the software module currently running with the highest count. In another configuration, the duration of execution for the current configuration of the configurable co-processor core(s) 150 and the software module corresponding to the hardware accelerator may be compared to determine whether to reconfigure the configurable co-processor core(s) 150.

Referring again to FIG. 8, at block 814, a hardware accelerator is selected from the on-line hardware configuration store according to the determined usage pattern of the user. At block 816, a build file corresponding to the selected hardware accelerator is downloaded from the on-line hardware configuration store. At block 818, the build file corresponding to the selecting hardware accelerator is loaded into a configurable co-processor core(s) to operate as the selected hardware engine. For example, as shown in FIG. 1, the hardware controller 110 may reconfigure the configurable co-processor core(s) 150 to operate as a gaming engine 350 (FIG. 3), a video processing engine 450 (FIG. 4), a low power image processing engine 550 (FIG. 5), a high power image processing engine 650 (FIG. 6), or other like hardware accelerator.

In the auto-reconfiguration mode, the user is not involved in the build selection process. Instead, the multi-core CPU 120 of wireless mobile device 100 learns the usage pattern of the end user and intelligently selects a build file of a corresponding hardware accelerator available from the on-line hardware configuration store. Once the build file is downloaded, the hardware controller 110 may automatically reconfigure the configurable co-processor core(s) 150 for operation based on the use-case(s)/usage-pattern. This auto-reconfiguration can take place in the background to reduce/hide lag/delays associated with the configuration changes.

This solution provides the advantages of FPGA (field-programmable gate array) based designs to the main stream computing, while preserving the processor based design methodology. In particular, the auto-reconfiguration mode may adaptively adjust/change the hardware in the device to work better (or even optimally) for a user's changing usage pattern. Additionally, the auto-reconfiguration mode makes continuous/improved use of the reconfigurable fabric in the wireless mobile device 100. Because, the auto-reconfiguration mode detects the hardware accelerator that is specified for efficient operation of the wireless mobile device and configures the reconfigurable fabric in advance, configuration latency associated with reconfiguring medium or large cores is hidden from the user. The auto-reconfiguration mode may provide improved power, performance and resource utilization by learning a user's usage pattern. The auto-reconfiguration mode may dynamically improve (or even optimize) the device for each individual user and for changing usage patterns of each user.

The preferred (hardware) build selection by the end user based on his use-case(s) of current interest and reconfiguration of the configurable co-processor core(s) 150 may be similar to a firmware update and application installation through selection from the on-line hardware configuration store 200. The process is supported without involving a software change. The auto-reconfiguration by the CPU is based on the determined usage pattern(s) of the user. This highlights flexible hardware and improved operation in addition to higher performance.

The flexibility of reconfiguring a portion of the hardware according to the use case(s) of current interest for the end user is a process that may be similar to application installation and firmware download. This type of process involves a configuration-build library that is available through the on-line hardware configuration store 200. The end user reconfiguration of the configurable co-processor core(s) 150 from the on-line hardware configuration store 200 based on the use-case(s) of current interest and auto-reconfiguration by the CPU based on learning the usage patterns of the end user for reconfiguration of the configurable co-processor core(s) 150 are performed according to aspects of the present disclosure.

Figure 9:
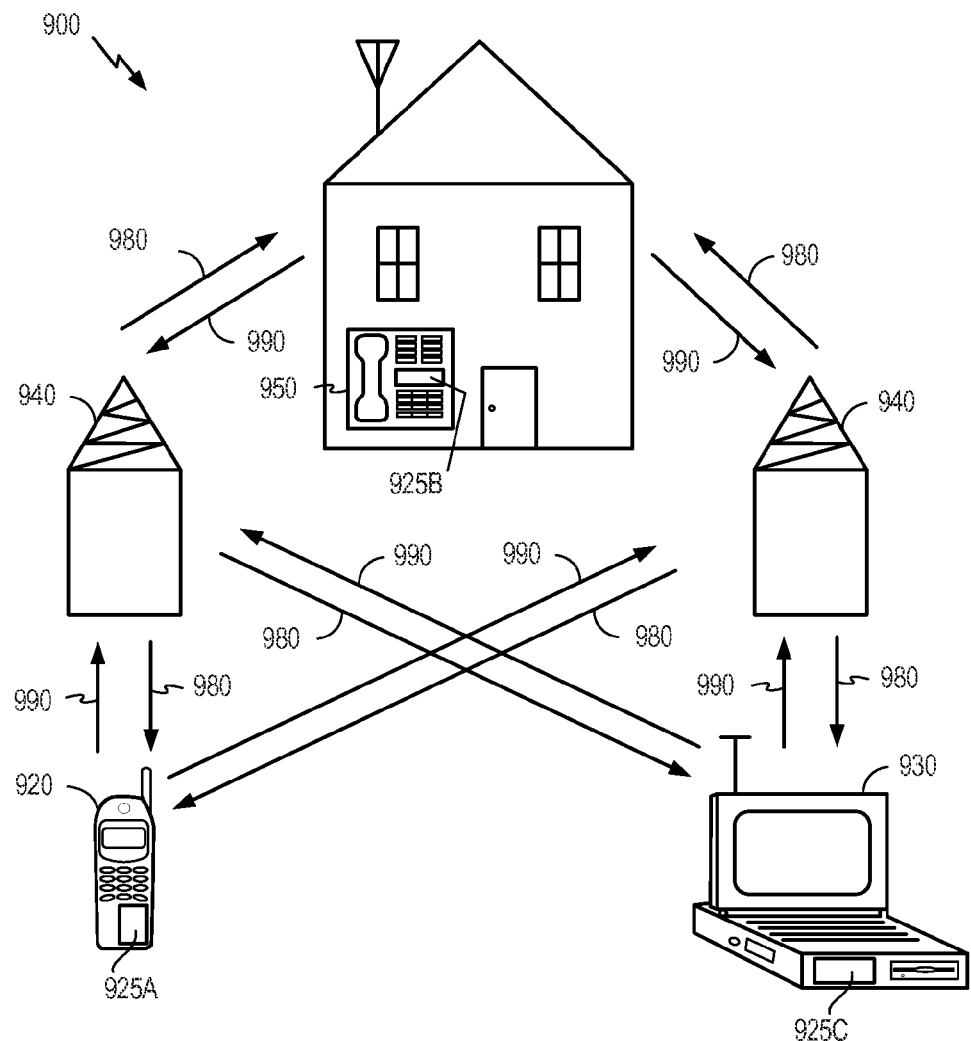
FIG. 9 is a block diagram showing an exemplary wireless communication system in which an aspect of the disclosure may be advantageously employed.

According to a further aspect of the present disclosure, a wireless mobile device includes a configurable co-processor core(s). The wireless mobile device also includes a multi-core central processing unit (CPU) coupled to a memory. The multi-core CPU selects from a set of hardware accelerators according to a user's use pattern. The wireless mobile device further includes a means for reconfiguring the configurable co-processor core(s) according to a selected hardware accelerator. The reconfiguring means may be the hardware controller 110 of the wireless mobile device 100/300/400/500/600. In another aspect, the aforementioned means may be any module or any apparatus configured to perform the functions recited by the aforementioned means, FIG. 9 is a block diagram showing an exemplary wireless communication system 900 in which an aspect of the disclosure may be advantageously employed. For purposes of illustration, FIG. 9 shows three remote units 920, 930, and 950 and two base stations 940. It will be recognized that wireless communication systems may have many more remote units and base stations. Remote units 920, 930, and 950 include IC devices 925A, 925C and 925B, which include the disclosed configurable core. It will be recognized that any device containing an IC may also include the disclosed configurable core, including the base stations, switching devices, and network equipment. FIG. 9 shows forward link signals 980 from the two base stations 940 to the remote units 920, 930, and 950 and reverse link signals 990 from the remote units 920, 930, and 950 to the two base stations 940.

Figure 10:
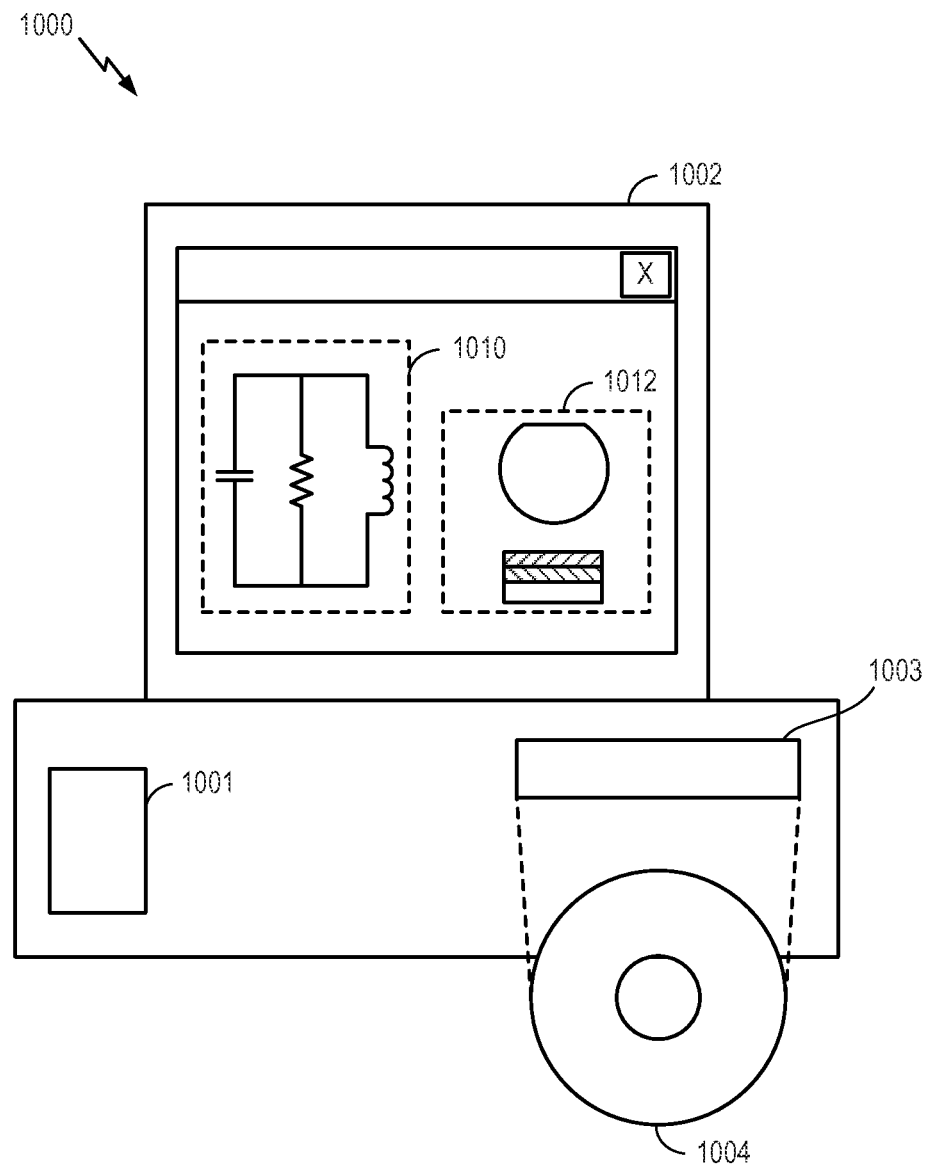
FIG. 10 is a block diagram illustrating a design workstation used for circuit, layout, and logic design of a semiconductor component according to an aspect of the present disclosure.

In FIG. 9, one of the remote units 920 is shown as a mobile telephone, one of the remote units 930 is shown as a portable computer, and one of the remote units 950 is shown as a fixed location remote unit in a wireless local loop system. For example, the remote units may be mobile phones, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof. Although FIG. 9 illustrates remote units according to the teachings of the disclosure, the disclosure is not limited to these exemplary illustrated units. Aspects of the disclosure may be suitably employed in any device that includes a configurable core, FIG. 10 is a block diagram illustrating a design workstation used for circuit, layout, and logic design of a. semiconductor component, such as a configurable core, as disclosed above. A design workstation 1000 includes a hard disk 1001 containing operating system software, support files, and design software such as Cadence or OrCAD. The design workstation 1000 also includes a display to facilitate a circuit design 1010 or a. semiconductor component 1012 such as an integrated circuit having configurable core circuitry. A storage medium 1004 is provided for tangibly storing the circuit design 1010 or the semiconductor component 1012. The circuit design 1010 or the semiconductor component 1012 may be stored on the storage medium 1004 in a file format such as GDSII or GERBER. The storage medium 1004 may be a CD-ROM, DVD, hard disk, flash memory, or other appropriate device. Furthermore, the design workstation 1000 includes a drive apparatus 1003 for accepting input from or writing output to the storage medium 1004.

Data recorded on the storage medium 1004 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 1004 facilitates the design of the circuit design 1010 or the semiconductor component 1012 by decreasing the number of processes for designing semiconductor wafers.

For a firmware and/or software implementation, the methodologies may be implemented with modules (e.g., procedures, functions, and so on) that perform the functions described herein. Any non-transitory machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include non-transitory computer-readable media encoded with a data structure and computer-readable media encoded with a computer program. Computer-readable media includes physical computer storage media. A non-transitory storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the Although specific circuitry has been set forth, it be appreciated by those skilled in the art that not all of the disclosed circuitry is required to practice the disclosure. Moreover, certain well known circuits have not been described, to maintain focus on the disclosure.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A method of hardware reconfiguration within a wireless mobile device, comprising:
    monitoring user activities to determine a user's use pattern;
    downloading a hardware accelerator among a plurality of hardware accelerators from an on-line hardware configuration store based on the determined user's use pattern; and
    reconfiguring one or more configurable co-processor cores of a general purpose processor according to the downloaded hardware accelerator.

2. The method of claim 1, comprising:
    monitoring the user activities to determine the user's use pattern over a period of time.

3. The method of claim 1,
    in which the monitoring further comprises:
        detecting execution of a software module corresponding to the hardware accelerator available from the on-line hardware configuration store;
        increasing a count associated with the software module corresponding to the hardware accelerator available from the on-line hardware configuration store;
        storing a duration of execution for the software module corresponding to the hardware accelerator available from the on-line hardware configuration store; and
        increasing the count for a current configuration of the one or more configurable co-processor cores when executed; and
    reconfiguring the one or more configurable co-processor cores to operate as the hardware accelerator available from the on-line hardware configuration store.

4. The method of claim 3, further comprising:
selecting the software module with a highest count when a plurality of software modules have a count difference from the current configuration of the one or more configurable co-processor cores; and
in which reconfiguring of the one or more configurable co-processor cores is performed when a difference between the count of the software module with the highest count and the count for the current configuration of the one or more configurable co-processor cores is greater than a threshold.

5. The method of claim 3, in which reconfiguring of the one or more configurable co-processor cores is performed when a difference between the duration of execution of the software module corresponding to the hardware accelerator available from the on-line hardware configuration store and a duration of execution for the current configuration of the one or more configurable co-processor cores is greater than a threshold.

6. The method of claim 3, in which the software module corresponding to the hardware accelerator available from the on-line hardware configuration store is the software module currently running within the wireless mobile device with a highest count.

7. The method of claim 1, in which the monitoring further comprises:
profiling each software module corresponding to the hardware accelerator available from the on-line hardware configuration store that is executed by the wireless mobile device; and
profiling execution of a current configuration of the one or more configurable co-processor cores.

8. The method of claim 1, in which the one or more configurable co-processor cores is integrated into a mobile phone, a set top box, a music player, a video player, an entertainment unit, a navigation device, a computer, a hand-held personal communication systems (PCS) unit, a portable data unit, and/or a fixed location data unit.

9. A method of hardware reconfiguration, comprising:
monitoring user activities of a general purpose processor to determine a user's use pattern;
selecting a hardware accelerator from a plurality of hardware accelerators from an on-line hardware configuration store based on the determined user's use pattern; and
loading the selected hardware accelerator into one or more configurable co-processor cores of the general purpose processor to operate as the selected hardware accelerator.

10. The method of claim 9, further comprising reconfiguring the one or more configurable co-processor cores as one or more general purpose co-processor cores.

11. The method of claim 9, in which the hardware accelerator comprises at least one of a gaming engine, a video processing engine, a low power image processing engine, and a high power image processing engine.

12. The method of claim 9, in which the one or more configurable co-processor cores is integrated into a mobile phone, a set top box, a music player, a video player, an entertainment unit, a navigation device, a computer, a hand-held personal communication systems (PCS) unit, a portable data unit, and/or a fixed location data unit.

13. A wireless mobile device, comprising:
one or more configurable co-processor cores;
a multi-core central processing unit coupled to a memory and the one or more configurable co-processor cores, the multi-core central processing unit operable to monitor user activities to determine a user's use pattern of a wireless mobile device and select from a plurality of hardware accelerators according to the determined user's use pattern; and
a hardware controller operable to reconfigure the one or more configurable co-processor cores according to a selected hardware accelerator.

14. The wireless mobile device of claim 13, in which the multi-core central processing unit is further operable to receive an indication from the user to provide a preference for the hardware accelerator, and to download the selected hardware accelerator from an on-line hardware configuration store.

15. The wireless mobile device of claim 13, in which the multi-core central processing unit is further operable to monitor the user activities to determine the user's use pattern over a period of time, and to download the selected hardware accelerator from an on-line hardware configuration store.

16. The wireless mobile device of claim 14, in which the hardware controller is further operable to reconfigure the one or more configurable co-processor cores when a difference between a duration of execution of an executed software module corresponding to the hardware accelerator available from the on-line hardware configuration store and a duration of execution for a current configuration of the one or more configurable co-processor cores is greater than a threshold.

17. A wireless mobile device, comprising:
one or more configurable co-processor cores;
a multi-core central processing unit coupled to a memory, the multi-core central processing unit comprising a means for monitoring user activities to determine a user's use pattern of a wireless mobile device and a means for selecting a hardware accelerator from a plurality of hardware accelerators according to the user's use pattern; and
a means for reconfiguring the one or more configurable co-processor cores according to the selected hardware accelerator.

18. The wireless mobile device of claim 17, integrated into a mobile phone, a set top box, a music player, a video player, an entertainment unit, a navigation device, a computer, a hand-held personal communication systems (PCS) unit, a portable data unit, and/or a fixed location data unit.

19. A computer program product for a wireless mobile device, the computer program product comprising:
a non-transitory computer-readable medium having program code recorded thereon, the program code comprising:
program code to monitor user activities of a wireless mobile device to determine a user's use pattern;
program code to select a hardware accelerator from a plurality of hardware accelerators according to the user's use pattern; and
program code to reconfigure one or more configurable co-processor cores of a general purpose processor according to the selected hardware accelerator.

20. The computer program product of claim 19, integrated into a mobile phone, a set top box, a music player, a video player, an entertainment unit, a navigation device, a computer, a hand-held personal communication systems (PCS) unit, a portable data unit, and/or a fixed location data unit.

21. A computer program product for a wireless mobile device, the computer program product comprising:
a non-transitory computer-readable medium having program code recorded thereon, the program code comprising:
monitoring user activities of a wireless mobile device to determine a user's use pattern;

program code to select a hardware accelerator from an on-line hardware configuration store; and program code to load the selected hardware accelerator into one or more configurable co-processor cores of a general purpose processor to operate as the selected hardware accelerator.

22. The computer program product of claim 21, integrated into a mobile phone, a set top box, a music player, a video player, an entertainment unit, a navigation device, a computer, a hand-held personal communication systems (PCS) unit, a portable data unit, and/or a fixed location data unit.

* * * * *